US006823673B2

(12) United States Patent
Cheng

(10) Patent No.: US 6,823,673 B2
(45) Date of Patent: Nov. 30, 2004

(54) LOWER CONTROL SYSTEM REGULATING THE FLOW RATE OF LIFTING JACK OIL

(75) Inventor: Hsien-Pi Cheng, Chia-I (TW)

(73) Assignee: Shinn Fu Corporation, Tao Yuan (TW)

( * ) Notice: Subject to any disclaimer, the term of this patent is extended or adjusted under 35 U.S.C. 154(b) by 89 days.

(21) Appl. No.: 10/397,207

(22) Filed: Mar. 27, 2003

(65) Prior Publication Data

US 2004/0187492 A1 Sep. 30, 2004

(51) Int. Cl.[7] .......... F16D 31/02
(52) U.S. Cl. .......... 60/481; 251/120
(58) Field of Search .......... 60/481, 482; 138/46; 251/120, 122

(56) References Cited

U.S. PATENT DOCUMENTS 6,240,726 B1 * 6/2001 Lin .......... 60/481
6,247,307 B1 * 6/2001 Hung .......... 60/479
6,742,767 B1 * 6/2004 Bruzek .......... 254/93 H
6,748,740 B2 * 6/2004 Fan .......... 60/479

* cited by examiner

*Primary Examiner*—Thomas E. Lazo
(74) *Attorney, Agent, or Firm*—Bacon & Thomas PLLC

(57) ABSTRACT

A lower control system serves to regulate the flow rate of lifting jack oil, and is installed between a reverse flow valve and an inner oil chamber, regulates the oil flow from the inner chamber to an outer chamber. The lower control system comprises an outer valve body, a steel ball, a spring, and a throttle body. The throttle body has a tapered portion, formed at its front end, and at least one throttling slot way and one lateral slot way, formed respectively on the tapered portion and the circumferential wall thereof. When the jack is not loaded, a reverse flow valve can lift the steel ball so that oil swiftly flows by the throttle body through the lateral slot ways to complete the reverse flow. When the jack is loaded, oil gently flows by the throttle body through the throttling slot ways, leading to a reduction of oil flow rate and a slower descending of the jack.

8 Claims, 5 Drawing Sheets

LOWER CONTROL SYSTEM REGULATING THE FLOW RATE OF LIFTING JACK OIL

BACKGROUND OF THE INVENTION (a) Field of the Invention

The present invention relates to a lower control system regulating the flow rate of lifting jack oil, more particularly to a mechanism that slows down oil flow under high oil hydraulic pressure and therefore achieve a slow and safe descending of a lifting jack.

(b) Description of the Prior Art

The conventional mechanism of reverse oil flow of a lifting jack utilizes a reverse flow valve to control oil in an inner chamber flowing back to an outer chamber, so that the lifting arm of a lifting jack may descend, restoring its the initial state. However, the conventional oil-reversing device cannot control the flow rate of lifting jack oil. Therefore, oil reversing under loading has a higher flow rate due to the high pressure in the inner oil chamber. As a consequence, the descending of the lifting arm of a lifting jack is swift under loading, which may endanger operational safety.

SUMMARY OF THE INVENTION

Accordingly, the primary object of the present invention is to provide a lower control system regulating the flow rate of lifting jack oil, which is suitable to be installed between a reverse flow valve and an inner oil chamber of a lifting jack to uniformize the oil flow rate in various loading situations. Especially when the jack is loaded, the control system slows down oil reversing to prevent the lifting arm from descending too fast.

To achieve above object, the present invention comprises an outer valve body, a steel ball, a spring, and a throttle body. The throttle body has a tapered portion, formed at its front end, and at least one throttling slot way and one lateral slot way, formed respectively on the tapered portion and the circumferential wall thereof. When the jack is not loaded, a reverse flow valve can lift the steel ball so that oil swiftly flows by the throttle body through the lateral slot ways to complete the reverse flow. When the jack is loaded, oil gently flows by the throttle body through the throttling slot ways, leading to a reduction of oil flow rate and a slower descending of the jack.

The various objects and advantages of the present invention will be more readily understood from the following detailed description when read in conjunction with the appended drawing.

DETAILED DESCRIPTION OF THE PREFERRED EMBODIMENTS

Figure 1:
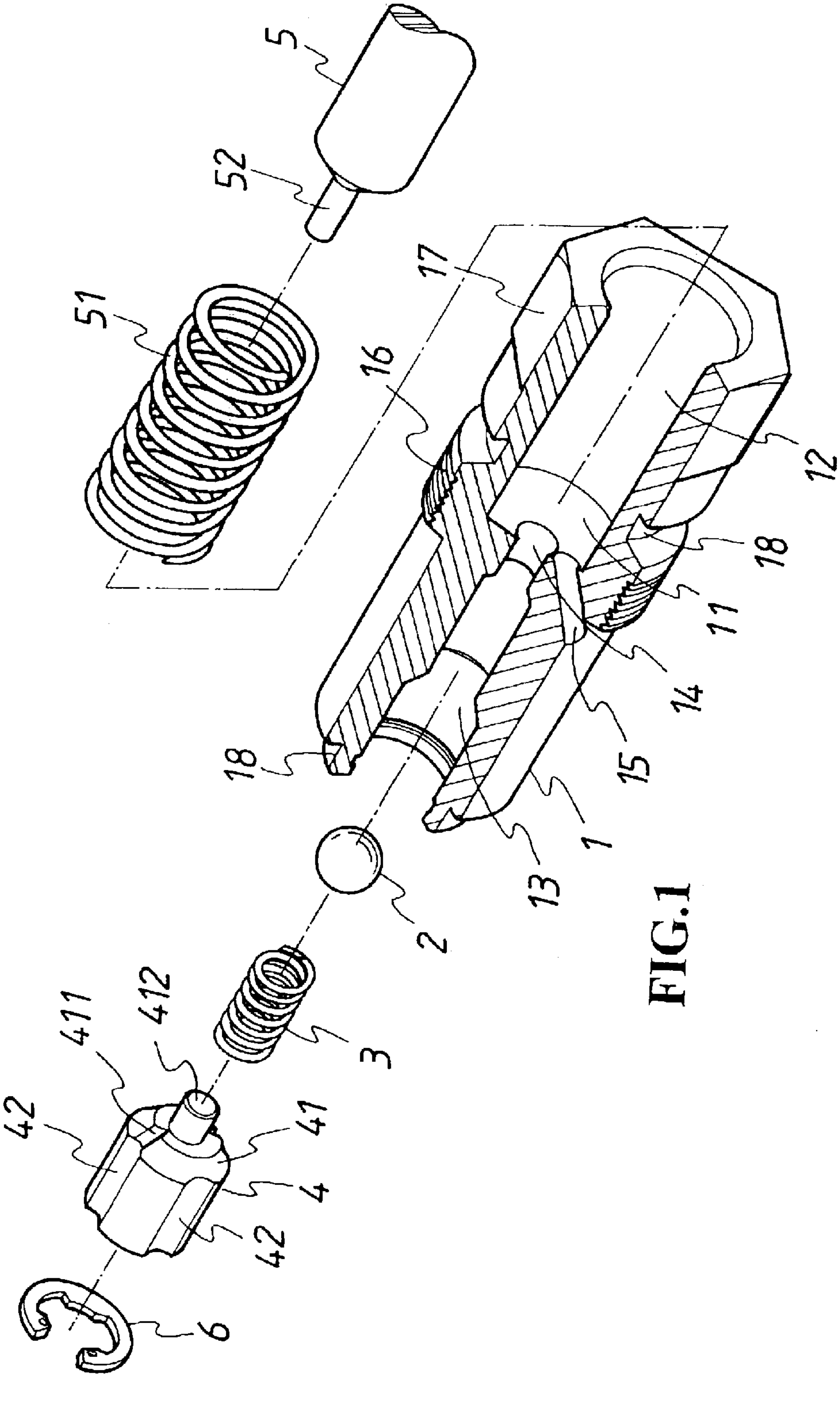
FIG. 1 is an exploded view of the present invention.

Referring to FIG. 1, the lower control system regulating the flow rate of lifting jack oil according to the present invention comprises an outer valve body 1, a steel ball 2, a spring 3, and a throttle body 4. The outer valve body 1 is a hollow valve body in which a dividing portion 11 divides the interior into a front chamber 12 and a rear chamber 13. A valve hole 14 is formed to connect both sides the dividing portion 11. An oil lead 15 is formed through the wall of the front chamber 12 at a selected location. The front chamber 12 receives a spring 51 and a reverse flow valve 5, whereas the rear chamber 13 receives in order a steel ball 2, a spring 3, a throttle body 4, and a retaining ring 6.

The steel ball 2 is used to close the valve hole 14. One end of the spring 3 holds against the steel ball 2, and the other end thereof holds the throttle body 4.

Figure 3:
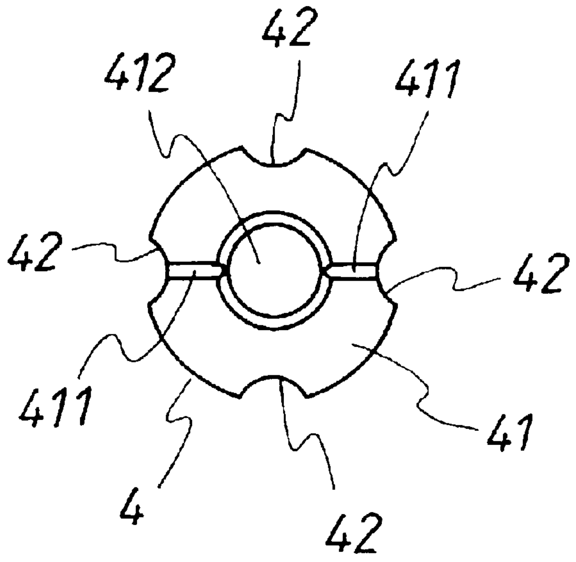
FIG. 3 is a top view of a throttle body according to the present invention.
Figure 2:
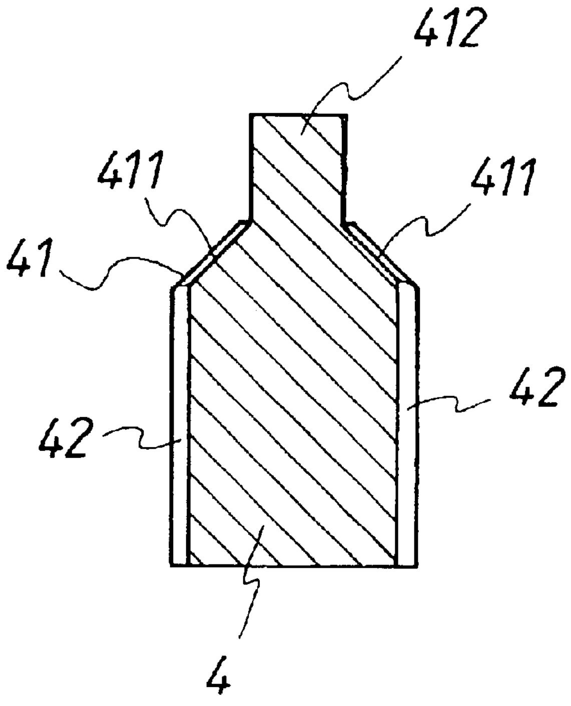
FIG. 2 is a cross-sectional view of a throttle body according to the present invention.

As shown in FIGS. 1 to 3, the throttle body 4 has a tapered portion 41 formed at one end, a throttling slot way 411 and a lateral slot way 42 being formed on the tapered portion 41 and on the circumferential wall of the throttle body 4. A locating pin 412 is formed on the top face of the tapered portion 41 for settling the spring 3. A retaining ring 6 is inserted within the end opening of the rear chamber 13 of the outer valve body 1 for stopping the throttle body 4 from being ejected outwardly by the spring 3.

Figure 4:
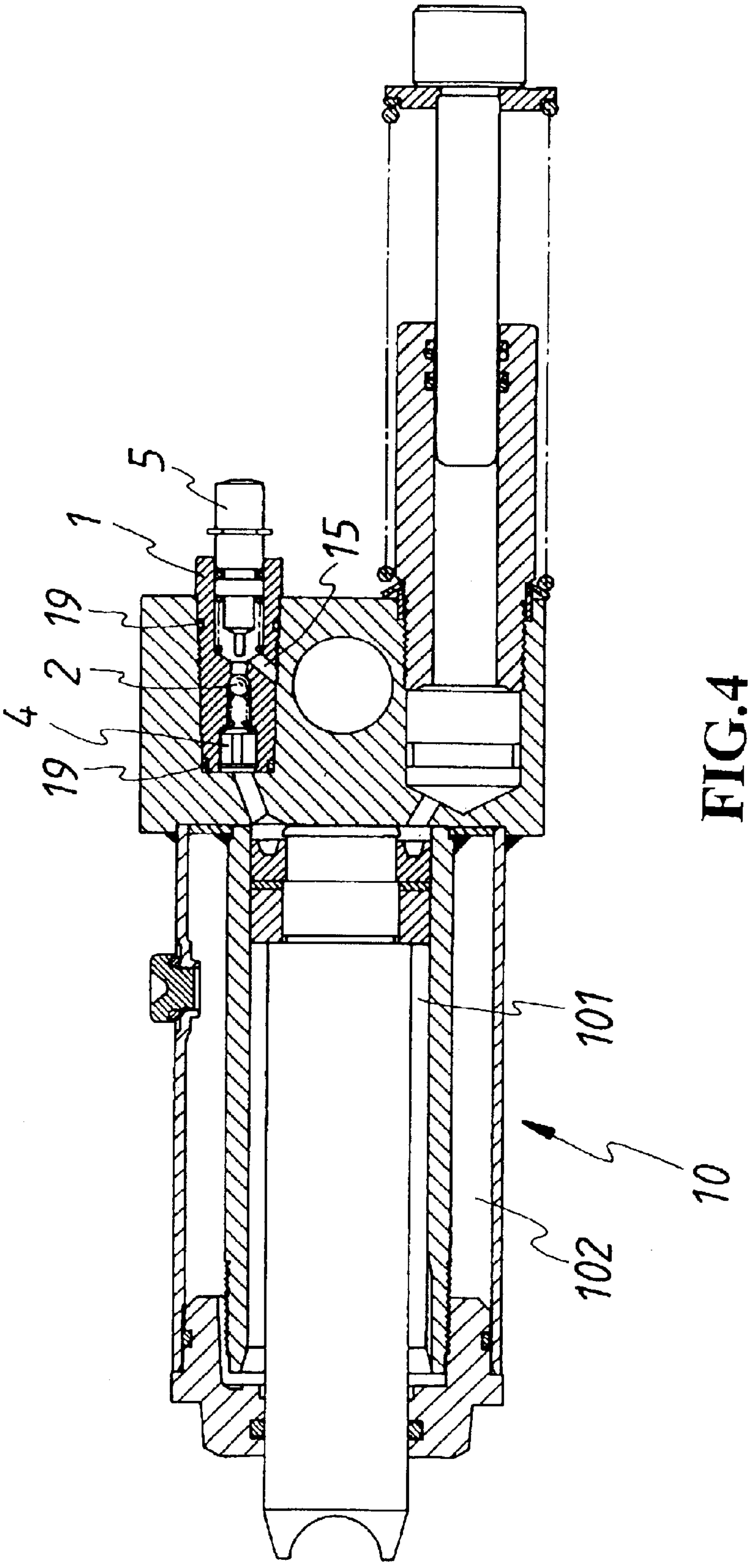
FIG. 4 is a cross-sectional view of the present invention being installed between a reverse flow valve and an inner oil chamber of a lifting jack.

As shown in FIG. 4, the lower control system regulating the flow rate of lifting jack oil according to the present invention is particularly suitable to be installed between the reverse flow valve 5 of a lifting jack 10 and an inner oil chamber 101. As the lifting jack 10 is loaded and the reverse flow valve 5 open so that oil reversing is activated, the present invention serves as a mechanism to control the oil flow from the inner oil chamber 101, thereby the oil flows through the reverse flow valve to an outer oil chamber 102 in a slow and uniform manner. In this way, the lifting jack 10 descends at a gentle speed so that the operational safety is assured.

The outer valve body 1 just disclosed has a thread portion 16 and a polygon portion 17 formed on the outer wall of the front chamber 12 thereof, for being firmly integrated with the lifting jack 10. The outer valve body 1 further contains one or more oil seal slots 18 for receiving oil seal components 19 in order to prevent oil leakage.

The above-mentioned reverse flow valve 5 has a lifting pin 52 formed at the front end thereof for opening the valve hole 14 by pushing the steel ball 2 away from the valve hole 14.

Figure 5:
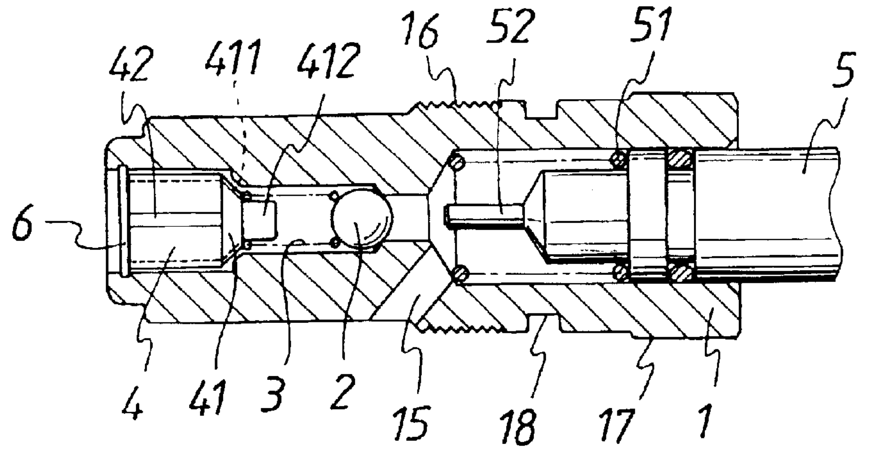
FIG. 5 is a cross-sectional view of the present invention when the reverse flow valve is closed.
Figure 6:
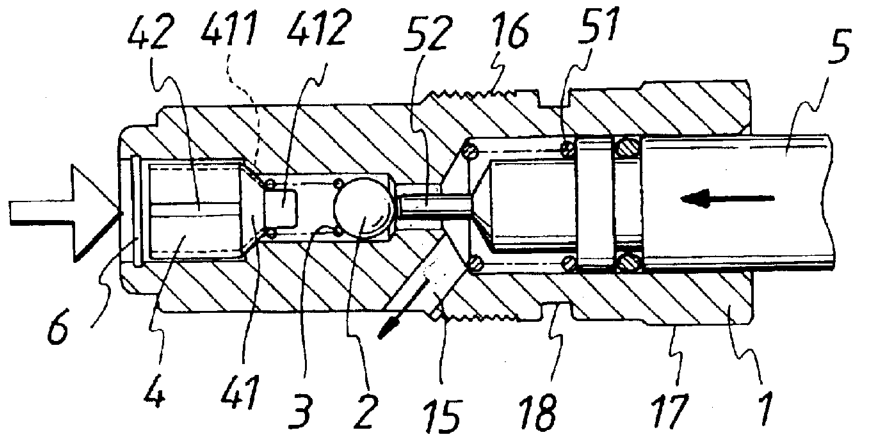
FIG. 6 illustrates oil reversing when the present invention is in a loaded state.
Figure 7:
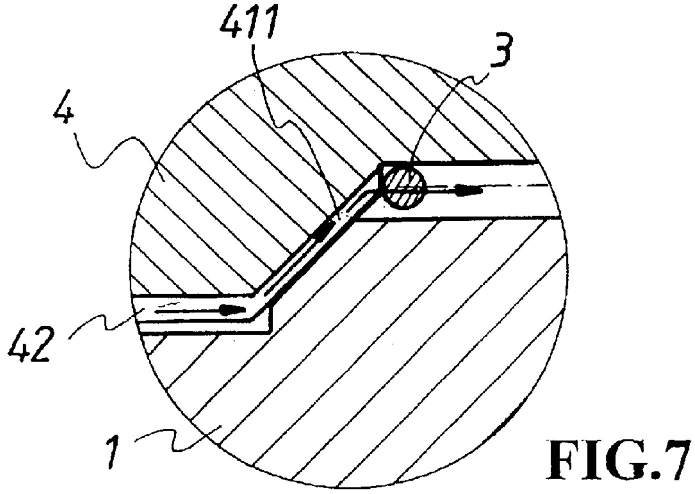
FIG. 7 is an enlarged view illustrating the oil flow rate being restricted when the present invention is in a loaded state.

As shown in FIG. 5, the reverse flow valve 5 of the lower control system regulating the flow rate of lifting jack oil according to the present invention is closed and oil reversing is not allowed. In this situation the steel ball 2 holds against the valve hole 14 to prevent oil from flowing through the oil lead 15. When the jack is in a loaded state, as shown in FIG. 6, immense oil hydraulic pressure from the inner oil chamber 101 compresses the spring 3, leading to a close contact between the tapered portion 41 of the throttle body 4 and the corresponding inner wall of the outer valve body 1, as shown in FIG. 7. In this configuration, oil flows from the inner oil chamber 101 to the outer oil chamber 102 only through the throttling slot ways 411 on the tapered portion 41 of the throttle body 4, and therefore the flow rate is restricted. This regulation of oil flow effectively prevents the lifting jack 10 from fast descending, assuring a slow and uniform downward motion. This measure reduces the risks of structural damage and hazards to personnel.

Figure 8:
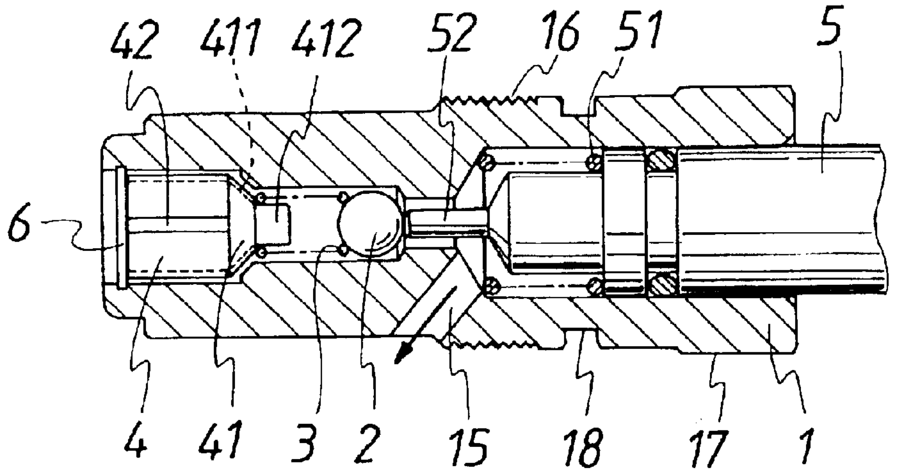
FIG. 8 illustrates oil reversing when the present invention is not loaded.
Figure 9:
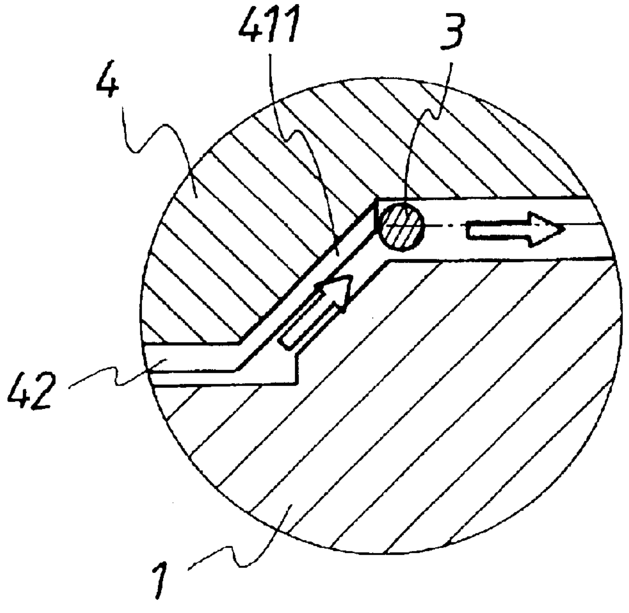
FIG. 9 is an enlarged view illustrating the oil flow rate being high when the present invention is not loaded.

FIG. 8 shows the operation of the lower control system regulating the flow rate of lifting jack oil when the jack is not loaded and undergoing oil reversing. Because of much less oil pressure exerting on the throttle body 4, the reverse flow valve 5 can eject the steel ball 2 and retreat the tapered portion 41 of the throttle body 4, making gap between the tapered portion 41 of the throttle body 4 and the corresponding inner wall of the outer valve body 1 more spacious, as shown in FIG. 9. Oil in this configuration can flow through the lateral slot ways 42 of the throttle body 4 in large amounts, leading to faster descending of the jack.

A lower control system regulating the flow rate of lifting jack oil is thus disclosed. It will be obvious that the same may be varied in many ways. Such variations are not to be regarded as a departure from the spirit and scope of the present invention, and all such modifications as would be obvious to one skilled in the art are intended to be included within the scope of the following claims.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A lower control system regulating a flow rate of lifting jack oil comprising an outer valve body being a hollow valve body and having a dividing portion which divides said outer valve body into a front chamber and a rear chamber; a valve hole being formed on said dividing portion and an oil lead being formed through a lateral wall of said front chamber at a selected location, a steel ball controlling the closure of said valve hole, a spring, and a throttle body having a tapered portion formed at a front end thereof; at least one throttling slot way and one lateral slot way being formed respectively on said tapered portion and a circumferential wall of said throttle body;

said spring having one end holding against said steel ball and another end holding said throttle body; said rear chamber receiving said steel ball, said spring, said throttle body, and a retaining ring sequentially;

said lower control system regulating the flow rate of lifting jack oil, with said steel ball holding against said valve hole, prohibiting exchange of lifting jack oil between an inner oil chamber and an outer oil chamber through said oil lead; said lower control system regulating the flow rate of lifting jack oil, with said lifting jack being loaded, restricting the flow rate of lifting jack oil from said inner oil chamber to said outer oil chamber; said restricting effect being realized by a close contact between said tapered portion of said throttle body and a corresponding inner wall of said rear chamber, and therefore oil flowing only through said throttling slot ways on said tapered portion; said close contact being achieved by said throttle body being pushed by said spring that is compressed due to the high hydraulic pressure in said inner oil chamber.

2. The lower control system regulating the flow rate of lifting jack oil of claim 1, wherein said front chamber of said outer valve body receiving a spring and a reverse flow valve.

3. The lower control system regulating the flow rate of lifting jack oil of claim 2, wherein said reverse flow valve has a lifting pin.

4. The lower control system regulating the flow rate of lifting jack oil of claim 1, wherein a locating pin extends from said tapered portion of said outer valve body.

5. The lower control system regulating the flow rate of lifting jack oil of claim 1, wherein said retaining ring is inserted within an end opening of said rear chamber of said outer valve body for blocking said throttle body.

6. The lower control system regulating the flow rate of lifting jack oil of claim 1, wherein said oil lead of said outer valve body leads to said outer oil chamber of said lifting jack.

7. The lower control system regulating the flow rate of lifting jack oil of claim 1, wherein said outer valve body has a thread portion and a polygon portion formed on an outer wall of said front chamber thereof.

8. The lower control system regulating the flow rate of lifting jack oil of claim 1, wherein said outer valve body contains at least one oil seal slot for receiving an oil seal component.

* * * * *